E. M. LANG.

Machines for Casting Solder Wire.

No. 5,862. Reissued May 5, 1874.

Attest:
D. W. Scribner
F. E. Jordan

Inventor:
Edward M. Lang
Per atty. Wm. H. Clifford

UNITED STATES PATENT OFFICE.

EDWARD M. LANG, OF PORTLAND, MAINE.

IMPROVEMENT IN MACHINES FOR CASTING SOLDER-WIRE.

Specification forming part of Letters Patent No. 112,054, dated February 21, 1871; reissue No. 5,862, dated May 5, 1874; application filed January 4, 1872.

*To all whom it may concern:*

Be it known that I, EDWARD M. LANG, of Portland, in the county of Cumberland and State of Maine, have invented a new and useful Machine for the Manufacture of Solder-Wire, and a method of preparing the same for soldering cans; and I hereby declare the following to be a full, clear, and exact description of the same, reference being had to the accompanying drawing, in which—

Figure 1:
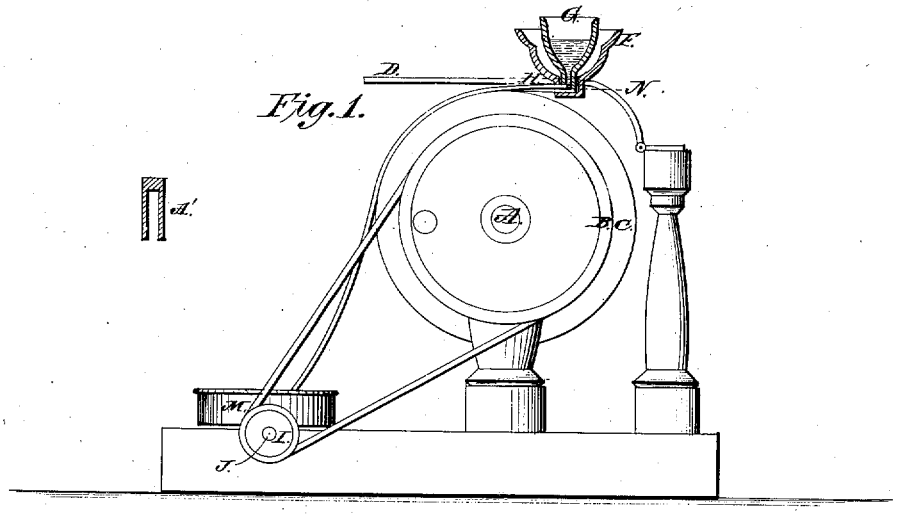
Figure 2:
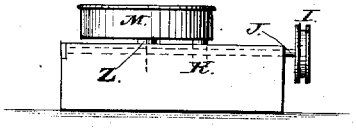
Figure 3:
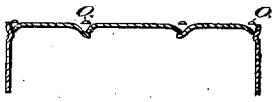

Figure 1 is a side elevation of my invention, and a section of the wheel C at A′. Fig. 2 is a detail of the coiling device. Fig. 3 is a section of the walls of a fruit-can and its cover, showing the method of using and applying the wire.

The object of my invention is a convenient method of manufacturing solder-wire for capping or soldering tin cans.

The machine upon which said wire is manufactured may be thus described:

A is the main shaft of the machine, upon which shaft are rigidly fixed the wheels B and C. Directly over the wheel C is placed a platform, D, which is capable of being removed or lifted from the wheel. Upon this platform is a furnace, F, containing a pot or crucible, G, having an opening in the bottom, which terminates in the nozzle H, resting on the periphery of the wheel C. The wheel C is hollow, and is constructed in the manner shown at A′.

The edge or periphery on the outer surface of the wheel C is made flat. The object of this is, that one side of the solder-wire which is made by this machine shall also be flat, being cooled in this form on the under side as it passes over a portion of the periphery of the wheel C. The fast pulley I on the shaft J is rotated by a band from the wheel B. The shaft J is also provided with a friction-roller, K, rigidly fixed thereon, and in contact with the under side of the tub M. This tub has, at its center, the pivot L, upon which it rotates when moved by the revolution of the roller K, or any equivalent device. The opposite side of the tub may rest upon a stationary truck or roller to keep it even.

In using the machine, the melted solder is placed in the crucible or pot G, in which it is held at the proper temperature by burning coals placed in the furnace F. The solder flows from the crucible through the nozzle H, and thence upon the edge or periphery of the wheel C.

N shows a valve, by which the flow of the melted solder may be regulated, or entirely cut off, through the nozzle H and upon the wheel C. The solder is formed into a wire by the rotation of the wheel C. This wheel may be kept at a low temperature by keeping an arc filled with a supply of cool water. This remaining for the most part at the said lower arc of the wheel, will enable the operator to regulate the temperature of the wheel C as he may desire. The wire thus formed has a flat surface on the under side, and is altogether of a shape seen and illustrated at O, Fig. 3. The wire passes down over the wheel C into the tub M, within which it is coiled by the revolution of the tub; or a shaft, either upright or horizontal, may be substituted for the tub, and the wire coiled around the shaft spirally. The size of the shaft upon which the wire is wound may, it is evident, be made of such size or diameter as the particular use to which it is to be devoted may demand.

I am already the grantee of Letters Patent of the United States for a machine for casting solder in wire or sticks. This I do not now claim.

Wire has in some cases been formed by forcing the solder through holes or punctures through a metal plate, but not, as I am aware, upon the smooth surface of a rotating wheel.

The flat wire produced by this device is applied, with great convenience and economy of both time and material, to the soldering of covers and studs of cans for the preservation of fruit. When the wire is designed for this purpose it is coiled spirally upon a shaft or cylinder of a diameter nearly equal to that of the stud or cover to which it is to be applied. When the shaft is filled, a knife is drawn from end to end of the shaft. The rings of solder thus formed are placed upon the cans, as shown in Fig. 3, the flat edge of the wire being in contact with the walls of the can, or, in case of studs, in contact with the surrounding cover. The flat surface of the wire prevents the wire from slipping from place under pressure of the soldering-iron.

The inferiority of the old method of soldering cans when compared with this is easily seen. In the old method the solder in a large stick was held in one hand, and the heated iron in the other, and the iron, pressed against the solder, was carried around the cover or stud.

The great superiority of my method lies in the rapidity of the operation, while the old process entailed waste of solder, more frequent heating of the iron, and a less neat appearance of the cans.

It will be perceived that, by the winding or coiling device herein described, coils or circles of the wire can be manufactured with rapidity, suitable in diameter and in weight or size of wire to any purpose or article to which it may be desired to apply the said wire.

What I claim as my invention, and desire to secure by Letters Patent, is—

1. The improved method of manufacturing solder-wire, viz., by the combination of the furnace F, crucible G, nozzle and valve H and N, and the wheel C, having the flat and smooth surface in rotation, substantially as herein described.

2. The winding or coiling machinery, consisting of the shaft J, the truck K, and the tub M, or equivalent, in conjunction with the casting apparatus, as herein described.

EDWARD M. LANG.

Witnesses:
D. W. SCRIBNER,
F. E. JORDAN.